June 23, 1925.
E. G. FISHER
OVEN PAN
Filed June 21, 1924
1,542,867
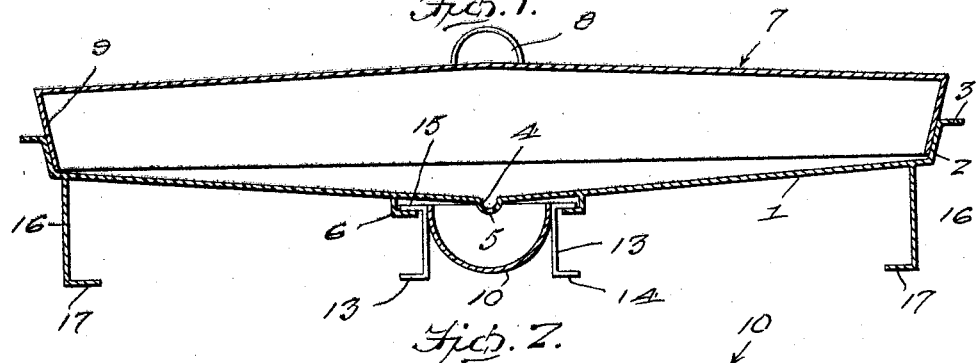
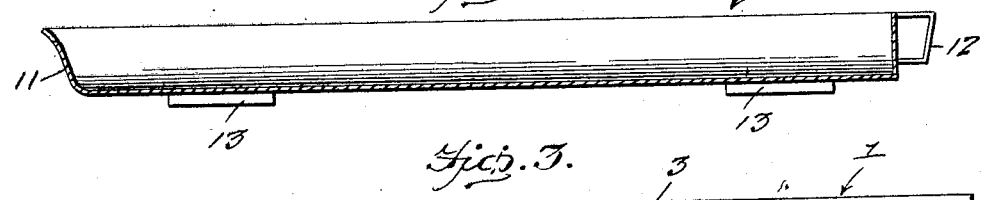
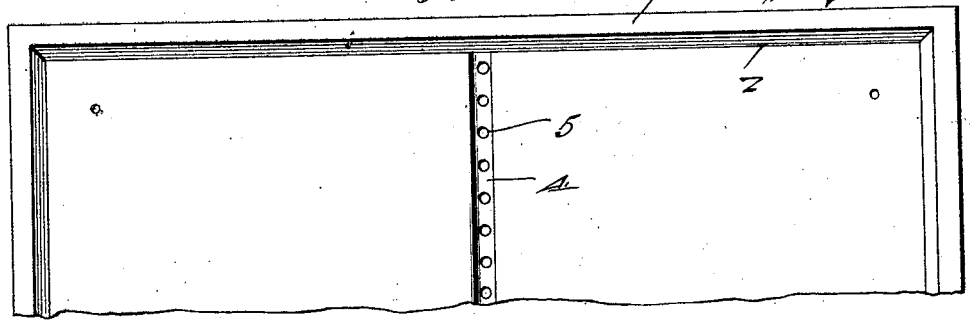
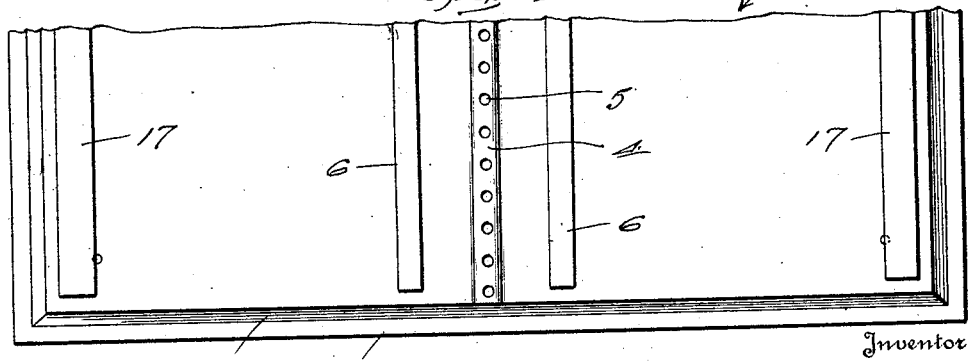
Inventor
Edith Campfield Fisher
By Clarence O'Brien
Attorney Patented June 23, 1925.

1,542,867

UNITED STATES PATENT OFFICE.

EDITH CAMPFIELD FISHER, OF CLEVELAND, OHIO.

OVEN PAN.

Application filed June 21, 1924. Serial No. 721,521.

*To all whom it may concern:*

Be it known that I, EDITH CAMPFIELD FISHER, a citizen of the United States, residing at Cleveland, in the county of Cuyahoga and State of Ohio, have invented a new and useful Oven Pan, of which the following is a specification.

This invention relates to an improved oven pan for cooking utensils of the type embodying means for collecting the grease and meat juices in a separate receptacle, to render them available for basting purposes.

The object of the invention is to generally improve upon utensils of this class, by providing one which is simply composed of three parts; namely, a baking pan for the meat, a removable cover therefor, and a separate and independent juice collecting receptacle, all of these parts being of special construction to provide what is thought to be a more practical structural arrangement of parts than has been heretofore contemplated.

The structural features and advantages derived from their particular association and arrangement will become apparent from the following description and drawings.

In the accompanying drawings, forming a part of this application, and in which like numerals are employed to designate like parts throughout the same:

Figure 1 is a transverse section through a device constructed in accordance with the present invention, showing the parts in position to be placed in an oven.

Figure 2 is a central longitudinal section through the supplemental juice collecting receptacle.

Figure 3 is a fragmentary top plan view of the meat pan.

Figure 4 is a bottom plan view of Figure 3.

In carrying out the invention, I employ a pan 1 which may be of any appropriate configuration, but which is preferably of the shape shown, the same being provided with a surrounding rim 2, carrying lateral flanges 3, adapted to rest upon the ledges in an oven. The bottom of the pan is inclined downwardly toward the center, and at this point is provided with a stamped depression forming a juice collecting gutter 4. To permit the passage of juice from the gutter, it is provided with a row of discharge ports or apertures 5. On its under side, and on opposite sides of the gutter, the bottom of the pan is provided with guide or supporting tracks 6 of angular cross section, as shown clearly in Figure 1.

As before intimated, a cover 7 is adapted to be used in connection with the pan for boiling, steaming, baking, etc. The cover is preferably provided with a handle 8 and is relatively deep, the marginal skirt or wall 9 thereof inclining inwardly and adapted to telescope into the pan 1.

Disposed beneath the apertured gutter 4, is the juice collecting receptacle, generally referred to by the reference character 10. This is of a length, corresponding to the length of the pan and it is adapted to extend beneath the gutter to receive the meat juices therefrom. It is substantially channel shaped in cross section, and one end thereof is fashioned to provide a discharge spout 11, the other end being equipped with a handle 12, to facilitate handling. If desired, the receptacle 10 may be provided with supporting legs 13 having laterally and outwardly directed feet 14. In fact, the upper ends of the legs may be directed laterally, as indicated at 15, to provide supporting lugs adapted to slidably engage the aforesaid tracks 6.

In practice, the receptacle 10 is slid beneath the apertured gutter 4, and suspended in this position through the medium of the lateral lugs 15. If the pen is to be positioned in an oven, the aforesaid flanges 3 are rested slidably upon the usual supporting ledges. If, however, the pan is to be rested upon a stove or the like, it will be equipped with depending supports 16, having inturned lower ends 17, to rest upon the surface of the stove. The pan may be used with or without the cover, depending upon the particular method of cooking the meat. Owing to the tight contact of the juice collecting receptacle, with the bottom of the pan, the device may be used to advantage for steaming the meat, by placing hot water in the receptacle, and then placing the device upon the stove, the steam passing upwardly through the port in the aforesaid gutter. Under ordinary conditions, however, the receptacle serves to primarily collect juices from the meat in the pan, the juices running down the inclined bottom, and collecting in the gutter, from which they escape into the receptacle 10. The receptacle may now be moved and rested upon a table, through the medium of the supporting legs and teeth 13 and 14. The handle 12 may be used to advantage in handling the receptacle and the spout may be employed in good use in dispensing the juice from the receptacle into a dish or other source of deposit.

Although I have shown and described the preferred embodiment of the invention, it is to be understood that minor changes coming within the field of invention claimed may be resorted to, if desired.

I claim:

1. In an oven utensil of the class described, a juice collecting receptacle of elongated channel shaped cross section having one end thereof fashioned to form a discharge spout, provided at its opposite end with a handle, and U-shaped members fastened to the opposite walls of said receptacle, the upper laterally directed ends of said members constituting supporting lugs, and the lower laterally directed ends constituting supporting feet.

2. In an oven utensil of the class described, a baking pan adapted to receive the meat, the said pan being provided with a marginal rim having lateral supporting flanges, the bottom of said pan inclining downwardly and inwardly toward the center and being provided at the center with a depression apertured and forming a juice collecting gutter, guide members secured to the pan bottom on opposite sides of said gutter, a juice collecting receptacle disposed between said guides and provided with supporting means slidably resting on said guides, a removable cover provided with a depending skirt telescoping into said pan.

EDITH CAMPFIELD FISHER.